US011964696B2

(12) United States Patent
Alhuraibi et al.

(10) Patent No.: US 11,964,696 B2
(45) Date of Patent: Apr. 23, 2024

(54) STRUCTURAL FRAME FOR THE BODY OF A MOTOR VEHICLE

(71) Applicant: Jaguar Land Rover Limited, Coventry (GB)

(72) Inventors: Raidan Alhuraibi, Coventry (GB); David Wier, Coventry (GB); Jonathan Mabey, Coventry (GB); Mat Burgess, Coventry (GB); Ian Johnson, Coventry (GB); Martin Wheeler, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 28 days.

(21) Appl. No.: 17/298,900

(22) PCT Filed: Nov. 29, 2019

(86) PCT No.: PCT/EP2019/083073
§ 371 (c)(1),
(2) Date: Jun. 1, 2021

(87) PCT Pub. No.: WO2020/109544
PCT Pub. Date: Jun. 4, 2020

(65) Prior Publication Data
US 2022/0017148 A1 Jan. 20, 2022

(30) Foreign Application Priority Data
Nov. 30, 2018 (GB) ...................................... 1819517

(51) Int. Cl.
*B62D 25/08* (2006.01)
*B62D 21/02* (2006.01)
(Continued)

(52) U.S. Cl.
CPC .............. *B62D 25/08* (2013.01); *B62D 21/02* (2013.01); *B62D 21/11* (2013.01); *B62D 24/00* (2013.01);
(Continued)

(58) Field of Classification Search
CPC ...... B62D 23/005; B62D 21/02; B62D 21/11; B62D 25/04; B62D 25/06; B62D 25/08;
(Continued)

(56) References Cited

U.S. PATENT DOCUMENTS 7,641,269 B2 * 1/2010 Matsumoto ............ B62D 25/04
296/193.06
8,876,194 B2 * 11/2014 Dix ...................... B62D 21/152
296/203.02
2016/0107703 A1 4/2016 Briceno et al.

FOREIGN PATENT DOCUMENTS

CN 106275086 A 1/2017
CN 106985777 A 7/2017
(Continued)

OTHER PUBLICATIONS

ISA European Patent Office, International Search Report and Written Opinion Issued in Application No. PCT/EP2019/083073, dated Mar. 16, 2020, WIPO, 11 pages.
(Continued)

*Primary Examiner* — Dennis H Pedder
(74) *Attorney, Agent, or Firm* — McCoy Russell LLP

(57) ABSTRACT

Embodiments of the present invention provide a structural frame for a body of a motor vehicle, the structural frame defining, at least in part, an occupant compartment of the vehicle, the structural frame comprising a pair of spaced pillars joined together at an upper region of each pillar to a roof crossmember and further joined together at respective points below the roof crossmember to a structural cross-
(Continued)

brace, the structural cross-brace is further arranged to support a pair of spaced apart vehicle suspension connectors and, wherein the structural cross-brace projects from the pillars beyond the suspension connectors so that the space in the occupant compartment between the pillars is substantially unobstructed by the structural cross-brace and, at least a portion of the structural cross-brace is accommodated within the occupant compartment.

15 Claims, 4 Drawing Sheets

(51) Int. Cl.
*B62D 21/11* (2006.01)
*B62D 24/00* (2006.01)
*B62D 25/04* (2006.01)
*B62D 25/06* (2006.01)
*B62D 27/06* (2006.01)

(52) U.S. Cl.
CPC ............ *B62D 25/04* (2013.01); *B62D 25/06* (2013.01); *B62D 25/081* (2013.01); *B62D 27/06* (2013.01)

(58) Field of Classification Search
CPC ... B62D 25/081; B62D 25/085; B62D 25/088
USPC .......... 296/203.01, 2, 4, 193.06, 192, 96.21
See application file for complete search history.

(56) References Cited

FOREIGN PATENT DOCUMENTS

| | | |
|---|---|---|
| CN | 107187500 A | 9/2017 |
| CN | 206781881 U | 12/2017 |
| CN | 206841526 U | 1/2018 |
| EP | 1533213 A1 | 5/2005 |
| EP | 3202645 A2 | 8/2017 |
| JP | S60160276 U | 10/1985 |
| JP | H03109176 A | 5/1991 |
| JP | 2004331028 A | 11/2004 |
| JP | 2005225449 A | 8/2005 |
| RU | 2134209 C1 | 8/1999 |
| WO | 9741010 A1 | 11/1997 |
| WO | 03057529 A2 | 7/2003 |
| WO | 2018177397 A1 | 10/2018 |

OTHER PUBLICATIONS

Great Britain Intellectual Property Office, Combined Search and Examination Report under Sections 17 & 18(3) Issued in Application No. GB1917409.3, dated Apr. 28, 2020, 3 pages.

State Intellectual Property Office of the People's Republic of China, Office Action and Search Report Issued in Application No. 201980089434.4, dated Oct. 31, 2022, 24 pages.

* cited by examiner

STRUCTURAL FRAME FOR THE BODY OF A MOTOR VEHICLE

CROSS REFERENCE TO RELATED APPLICATIONS

The present application is a U.S. National Phase of International Application No. PCT/EP2019/083073 entitled "STRUCTURAL FRAME FOR THE BODY OF A MOTOR VEHICLE," and filed on Nov. 29, 2019. International Application No. PCT/EP2019/083073 claims priority to Great Britain Patent Application No. 1819517.2 filed on Nov. 30, 2018. The entire contents of each of the above-listed applications are hereby incorporated by reference for all purposes.

TECHNICAL FIELD

The present disclosure relates to a structural frame for the body of a motor vehicle. Aspects of the invention relate to a structural frame, a vehicle assembly, a vehicle body and a vehicle and these are the subjects of each of the independent claims.

BACKGROUND AND SUMMARY

Traditionally, vehicles (such as automobiles and the like) have used internal combustion engines as their source of motive power. Vehicles comprising internal combustion engines typically have a roof supported and spaced from a floor by pillars. A bulkhead (also known as a firewall or dash panel) extends linearly across the width of such vehicles, from a first pillar on one side of the vehicle to a second pillar on the other side of the vehicle. The bulkhead is located between and at least partially defines a boundary between an engine compartment of the vehicles and an occupant compartment provided within said vehicles. The bulkhead acts to provide protection from noise, heat and/or other emissions from the engine compartment to occupants of the vehicles, during use thereof. Additionally, bulkheads in such vehicles may provide reinforcement to the structure of the vehicles, for example providing increased structural stiffness to resist torsional loading of the vehicles and/or providing increased vertical strength to resist roof crush and/or loading from components of a suspension system of the vehicle. A cowl (otherwise known as a dash panel upper or windshield crossmember lower) is also typically provided, above the bulkhead, into which may be seated a windscreen.

With the increasing trend of using electric traction motors as a source of motive power, there is now more scope for space optimization. Traction motors may be packaged within the road wheels or under the floor and so the need for a rigid bulkhead separating engine compartment from occupant compartment is diminishing. There is simply less heat and noise generated by an electric traction motor compared to an internal combustion engine of the same power output. There is, however, still the need to maintain the structural rigidity of that area of the vehicle.

It is desirable to provide the greatest possible amount of space for the occupants of a vehicle to enhance the user experience, whilst maintaining structural rigidity and safety. Meanwhile, it is desirable to substantially maintain the external size of vehicles, for example in order to correspond to parking spaces, roadways and the like.

It is an object of embodiments of the invention to at least mitigate one or more of the problems of the prior art.

Aspects and embodiments of the invention provide a structural frame, a vehicle assembly, a vehicle body and a vehicle as claimed in the appended claims.

According to an aspect of the invention, there is provided a structural frame for a body of a motor vehicle, the structural frame defining, at least in part, an occupant compartment of the vehicle, the structural frame comprising a pair of spaced pillars joined together at an upper region of each pillar to a roof crossmember and further joined together at respective points below the roof crossmember to a structural cross-brace, the structural cross-brace is further arranged to support a pair of spaced apart vehicle suspension connectors and, wherein the structural cross-brace projects from the pillars beyond the suspension connectors so that the space in the occupant compartment between the pillars is substantially unobstructed by the structural cross-brace and, at least a portion of the structural cross-brace is accommodated within the occupant compartment.

Advantageously, the cross-brace (or a portion thereof) may thereby be useful for resisting loading from the vehicle suspension into the vehicle body in use. The suspension connectors may be configured (e.g. arranged or shaped and/or sized) to be connected or connectable (either directly or indirectly) to suspension assemblies of vehicles comprising structural frames according to the invention.

In some embodiments, the suspension connectors comprise at least one of: a shock tower; a strut tower; a suspension tower; a spring tower; and/or a wheel arch inner panel and, wherein the structural cross-brace is arranged to, at least in part, connect the suspension connectors to the roof crossmember via the pillars.

In an example, the structural frame comprises a base to which the pair of spaced pillars are mounted (e.g. detachably or permanently) at respective lower regions distal from the upper regions and roof crossmember and wherein the structural frame comprises one or more frame struts joining the structural cross-brace to the base.

Advantageously, ensuring that the space between the pillars is substantially unobstructed provides relatively increased space within the occupant compartment for the vehicle occupants, relative to prior art vehicles in which a bulkhead extends across and through this space. In motor vehicles and especially electrically powered vehicles, where an engine is not required to provide motive power, a bulkhead need not necessarily be provided as the electric motors are more easily packaged elsewhere in the vehicle such as in the wheel-hubs or under the vehicle floor. We have found that relatively increasing the volume of space provided for occupants of vehicles (as allowed through use of structural frames according to the invention) allows relatively enhanced comfort and user experience by occupants of said vehicles. Additionally, relatively increasing the volume of space provided for occupants of vehicles allows for different and/or variable layouts of seating, occupant supports and/or other occupant-relevant features within the space provided for occupants of vehicles.

Further beneficially, we have found that the arrangement of the cross-brace within structural frames according to the invention provides, even absent a bulkhead, the required structural stiffness to resist torsional loading of vehicles and the required strength to resist roof crush and to thereby maintain vehicles in conformity with relevant legislative requirements and safety standards.

In some embodiments, the structural cross-brace is arcuate in plan-view and extends substantially perpendicular to the pillars, the cross-brace extending from opposing end regions at the pillars towards a central region substantially at a centreline of the vehicle between the pillars and, wherein an inner face of the central region of the structural cross-brace is accommodated within the occupant compartment of the vehicle and an outer face of the central region of the structural cross-brace extends towards an exterior of the occupant compartment. In an example, the structural cross-brace is shaped to correspond with a glazing member of the vehicle, the glazing member located between the roof cross-member and the structural cross-brace and, wherein the structural cross-brace is provided with a glazing surface arranged to support and secure at least a portion of the glazing member so as to define, at least in part, a periphery of the occupant compartment.

In some embodiments, the structural cross-brace comprises an inner arc and an outer arc joined rigidly together by a stiffening flange interposed between the inner and outer arcs. The stiffening flange may, for example, extend along at least part of the length of the structural cross-brace. The stiffening flange may extend about or along an outer periphery of the cross-brace. The or a further stiffening flange may extend about or along an inner periphery of the cross-brace (for example along at least part of its length). In some embodiments, the stiffening flange may extend about or along substantially the entire periphery of the cross-brace. The cross-brace may comprise a flat plate (e.g. substantially flat plate), for example from which the or each stiffening flange may project. The further stiffening flange (e.g. at least a portion thereof) may be provided at least partially above (e.g. relative to the base) the stiffening flange. At least a portion of one or each of the pair of arms (where provided) may extend from the cross-member (where provided) to or toward the pillar at an angle relative to horizontal, for example at an angle relative to a plane defined by or containing the cross-member. The or each arm (e.g. at least a portion thereof) may secure the cross-brace to each pillar at a location above a plane defined by or containing the cross-brace. The or each arm (e.g. at least a portion thereof) may secure the cross-brace to each pillar at a location further spaced from the base and/or nearer to the roof member than a plane defined by or containing the cross-member.

In some embodiments, the structural cross-brace is further provided with mounting means with which to mount in the occupant compartment at least one of: a steering column; a display panel; a seating component; an energy absorbing passive occupant restraint device; a storage compartment; a vehicular user interface; an inflatable airbag; and/or an interior trim component.

In an example, the structural cross-brace defines a front end of the vehicle occupant compartment. Additionally or alternatively, the structural cross-brace defines a rear end of the vehicle occupant compartment.

In some embodiments, the structural cross-brace comprises a cross-member and a pair of arms which extend from the cross-member and secure the cross-brace to the pillars, the arms extending forwardly from the pillars such that the space between the pillars is unobstructed by the cross-member. The arms may extend forwardly from the pillars, e.g. such that the space between the pillars is unobstructed (e.g. substantially) by the cross-member. In an example, at least part of each arm of the structural cross-brace is above one of the suspension connectors. Additionally or alternatively, each arm of the structural cross-brace is attached or attachable to a respective one of the suspension connectors.

The pair of arms and cross-member may be integrally formed. Alternatively, one or both of the pair of arms may be attached to the cross-member (for example via welding, adhesive, attachments or attachment means or the like). In some embodiments, the pair of arms may extend forwardly from the pillars and be substantially parallel to one another. One or each of the pair of arms may extend substantially linearly. In embodiments, one or each of the pair of arms may extend in a non-linear manner, for example in an at least partially curved manner. One or each of the pair of arms may extend from the cross-member to or toward the pillars in a direction which is substantially parallel to the base (where provided), for example in a horizontal direction.

In embodiments, the cross-member (where provided) may be bowed, for example such that the cross-brace forms a generally C-shape or U-shape in plan. The cross-member may be configured or arranged (e.g. shaped) to provide (for example at least partially) a support for a windshield or windscreen of a vehicle comprising the structural frame. As will be appreciated, a bowed shape to the cross-member (in plan) may be suitable for providing support for a windshield or windscreen (which are typically bowed in plan cross-section). Advantageously, a vehicle comprising the structural frame may not require a cowl which is typically used to support a windshield or windscreen. In this way the number of components may be relatively reduced, with consequential savings in both time and expense of manufacture and in the quantity of materials used.

In some embodiments, the structural frame comprises a stiffening flange arranged to extend about an outer periphery of the structural cross-brace. In an example, the stiffening flange, or a further stiffening flange, extends about an inner periphery of the structural cross-brace. In an example, the structural cross-brace comprises a flat plate from which the or each stiffening flange projects.

In some embodiments, the structural frame further comprises one or more frame struts joining the structural cross-brace to the roof member.

According to another aspect of the invention for which protection is sought, there is provided a vehicle body comprising the structural frame according to any of the paragraphs above, wherein the structural cross-brace substantially conforms to a front profile of the vehicle body. In an example, an outer surface of the structural cross-brace defines, at least in part, an exterior surface of the vehicle body.

According to a further aspect of the invention for which protection is sought, there is provided a vehicle comprising a chassis assembly to which is mounted a structural frame and or a vehicle body according to any of the paragraphs above. In an example, the structural frame or vehicle body is detachably secured to the chassis assembly.

According to still another aspect of the invention, there is provided a structural frame for a body of a motor vehicle, the structural frame and body define at least in part an occupant compartment for the vehicle, the structural frame comprising a front, a base, a pair of spaced pillars mounted to the base, a roof member connected to each pillar and a cross-brace (e.g. structural) connected to each pillar at a location between the base and the roof member, wherein the cross-brace projects from the pillars in a forward direction, so that the space in the occupant compartment between the pillars is substantially unobstructed by the structural cross-brace and, wherein at least a portion of the structural cross-brace is accommodated within the occupant compartment. In an example, at least a portion of the structural cross-brace defines an exterior surface of the vehicle body.

In some embodiments, the pillars may comprise A-pillars or B-pillars. Accordingly, the structural frame according to the invention may provide relatively greater space for occupants at a location at or toward the front of said vehicles.

The base may define or provide (e.g. at least partially) a floor of a motor vehicle comprising the structural frame. The base may provide support for the or a floor of a motor vehicle comprising the structural frame. The base may be configured or configurable to support a floor of a motor vehicle. In some embodiments, the base may comprise a front and a rear portion. The front and rear portion may be located at or adjacent, respectively, the front and rear of a motor vehicle comprising the structural frame. The base may be configured to contain (e.g. substantially or entirely) a power unit, a powertrain and/or a drivetrain. The base may comprise or be attached to connection points for wheels or for one or more axles for wheels. In embodiments, the base (e.g. and/or the front, where provided) may comprise a chassis assembly (for example at least part thereof) of or for a vehicle. Alternatively, the base may be attached or attachable (e.g. detachably or permanently) to a chassis assembly of a vehicle. The chassis assembly may comprise or be configured to comprise a power unit and/or a drivetrain. Advantageously, the structural frame may thereby be mounted onto a chassis assembly, for example after at least partial manufacture of one or both. In this way the manufacturing/assembly process may be sped up, for example by allowing simultaneous manufacturing of plural parts of the vehicle.

In some embodiments, the structural frame may comprise a pair of aprons. The aprons may each include or be attached or attachable (e.g. directly or indirectly) to one of the suspension connectors (where provided). Each pillar may be mounted to the base adjacent (e.g. directly) or via (e.g. at least partially) one of the aprons. In embodiments, at least part of each arm (where provided) of the cross-brace may be above one or both of the aprons.

In embodiments, at least part of each arm (where provided) of the cross-brace may be above one or each of the suspension connectors (where provided), for example respective suspension connectors. Each arm of the cross-brace may be attached or attachable (e.g. directly or indirectly) to one of the suspension connectors, e.g. to a respective one of the suspension connectors. Beneficially, such an arrangement may enhance the ability of the structural frame to resist loads transferred through the suspension (for example in use).

The cross-brace may have an average thickness along its length of greater than 1.0 mm, for example greater than 1.1, 1.2, 1.3, 1.4, 1.5, 1.6, 1.7, 1.8, 1.9 or 2.0 mm, say greater than 2.25, 2.50, 2.75 or 3.00 mm. In embodiments, where the cross-brace comprises a plate, the plate may have an average thickness along its length of greater than 1.0 mm, for example greater than 1.1, 1.2, 1.3, 1.4, 1.5, 1.6, 1.7, 1.8, 1.9 or 2.0 mm, say greater than 2.25, 2.50, 2.75 or 3.00 mm. In some embodiments, the cross-brace may comprise a tube or tubular cross-section.

In embodiments, the structural frame may comprise one or more frame struts (e.g. a pair of spaced frame struts), for example joining the cross-brace to the base. In embodiments, the structural frame may comprise one or more frame struts (e.g. a pair of spaced frame struts) joining the cross-brace to the roof member. The structural frame may comprise a pair of spaced frame struts, for example joining the cross-brace to the base, for example and a pair of spaced frame struts joining the cross-brace to the roof member. The pair of spaced frame struts joining the cross-brace to the base may each attach to the cross-brace at off-set locations from the locations at which the pair of spaced frame struts joining the cross-brace to the roof member attach to the cross-brace. In embodiments, however, each of the pair of spaced frame struts joining the cross-brace to the base and each of the pair of spaced frame struts joining the cross-brace to the roof member may attach to the cross-brace at similar or the same positions along the cross-brace. In embodiments, the pair of spaced frame struts joining the cross-brace to the base may be integrally formed with the pair of spaced frame struts joining the cross-brace to the roof member.

In embodiments, two or more components (e.g. the components) of the structural frame (for example the pillars, cross-brace, base (where provided), front (where provided), roof member (where provided) and frame struts (where provided)) may be connected together permanently or removably. Where the components are connected together permanently this may be via welding and/or adhering or the like. Additionally or alternatively, the components may be fixed together using one or more fixing means or fixings, for example nuts and bolts, screws, pins, rivets or the like.

The roof member (where provided) may comprise a roof panel and/or a support member for a roof panel. Where the roof member comprises a support member for a roof panel, the support member may comprise attachment means or attachments for attaching to a or the roof panel. The attachment means may comprise one or more clips, catches, hooks, grips or the like.

The front (where provided) may be attached or connected (e.g. directly or indirectly) to the base (where provided), e.g. at or adjacent a front portion thereof.

In some embodiments, the structural frame may comprise a further cross-brace. The further cross-brace may be connected to each pillar. The further cross-brace may be configured (e.g. sized and shaped) to conform (e.g. substantially) to the cross-brace. The further cross-brace may be spaced from the cross-brace, e.g. by a substantially constant distance along the majority or entirety of its length. The further cross-brace may be forward or rearward of the cross-brace, e.g. may be nearer or further from the front than the cross-brace. The further cross-brace may comprise a further cross-member, for example with a further pair of arms extending from the further cross-member. The further cross-member may be substantially parallel to the cross-member (where provided). The further cross-member may be arranged or configured to conform (e.g. in size and/or shape) to the cross-member. The further cross-member may be substantially equally distant from the cross-member, e.g. along its length. The further pair of arms may secure the further cross-brace to the pillars. The further pair of arms may extend to or toward the pillars in a direction which is angled relative to the base (where provided), for example in a non-horizontal direction. The further pair of arms may secure the further cross-brace to the pillars at a location above the location where the pair of arms secures the cross-brace to the pillars. The further pair of arms may secure the further cross-brace to the pillars at a location above a plane defined by or containing the further-cross brace and/or the cross-brace. The further pair of arms may secure the further cross-brace to the pillars at a location further spaced from the base and/or nearer to the roof member than the location at which the pair of arms (where provided) secures the cross-brace to the pillars.

The pillars, cross-brace, front (where provided) and roof member (where provided) may comprise a top hat portion of a vehicle. The base may comprise a lower or skateboard portion or chassis of a vehicle. A skateboard portion or chassis may provide a self-contained base to which a body of a vehicle may be added or mounted, for example at a relatively limited (e.g. small) number of mounting or attachment points. The skateboard portion or chassis may comprise an underframe or lower frame or lower structure of a vehicle.

According to another aspect of the invention, there is provided a vehicle assembly comprising a structural frame as described herein and a suspension assembly connected to the structural frame at a plurality of suspension connectors.

In some embodiments, the suspension assembly may comprise a double wishbone suspension assembly. In some embodiments, the suspension assembly may comprise a MacPherson strut. Where the suspension assembly is a MacPherson strut the structural frame may be configured to counteract the relatively greater suspension loads produced by the MacPherson strut, in use, for example the structural frame may be configured to have a relatively greater or enhanced strength.

According to another aspect of the invention, there is provided a vehicle body comprising a structural frame as described herein, wherein the cross-brace substantially conforms (e.g. is shaped and/or sized to conform) to a front profile of the vehicle body.

In embodiments, the cross-brace may be at or adjacent (for example directly) a profile (e.g. a front profile) of the vehicle body. The cross-brace may at least partially define a profile (e.g. a front profile) of the vehicle body, additionally or alternatively, the cross-brace may at least partially define a profile such as a rear profile of the vehicle body. In some embodiments, the cross-brace may be adjacent (e.g. directly) a crumple zone or other crash structure, for example which at least partially defines the front profile of the vehicle body. In some embodiments, the cross-brace (e.g. the cross-member, where provided) may at least partially follow or conform to the front profile of a vehicle.

According to another aspect of the invention, there is provided a vehicle comprising a chassis assembly onto which is mounted a structural frame as described herein or a vehicle body as described herein.

In embodiments, the structural frame or vehicle body may be detachably secured to the chassis assembly. In embodiments, the chassis assembly may comprise a drivetrain and power unit. In embodiments, the power unit may comprise an electric motor. In embodiments, the vehicle may comprise an autonomous vehicle.

Within the scope of this application it is expressly intended that the various aspects, embodiments, examples and alternatives set out in the preceding paragraphs and/or in the following description and drawings, and in particular the individual features thereof, may be taken independently or in any combination that falls within the scope of the appended claims. That is, all embodiments and/or features of any embodiment can be combined in any way and/or combination that falls within the scope of the appended claims, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE FIGURES

One or more embodiments of the invention will now be described by way of example only, with reference to the accompanying drawings, in which:

FIG. 7A shows an example where a windscreen is supported by an outer or leading surface of a cross-brace of the structural frame, whereas the example shown in FIG. 7B shows an example where the windscreen is supported by an inner or trailing surface of a cross-brace.

DETAILED DESCRIPTION

Figure 1:
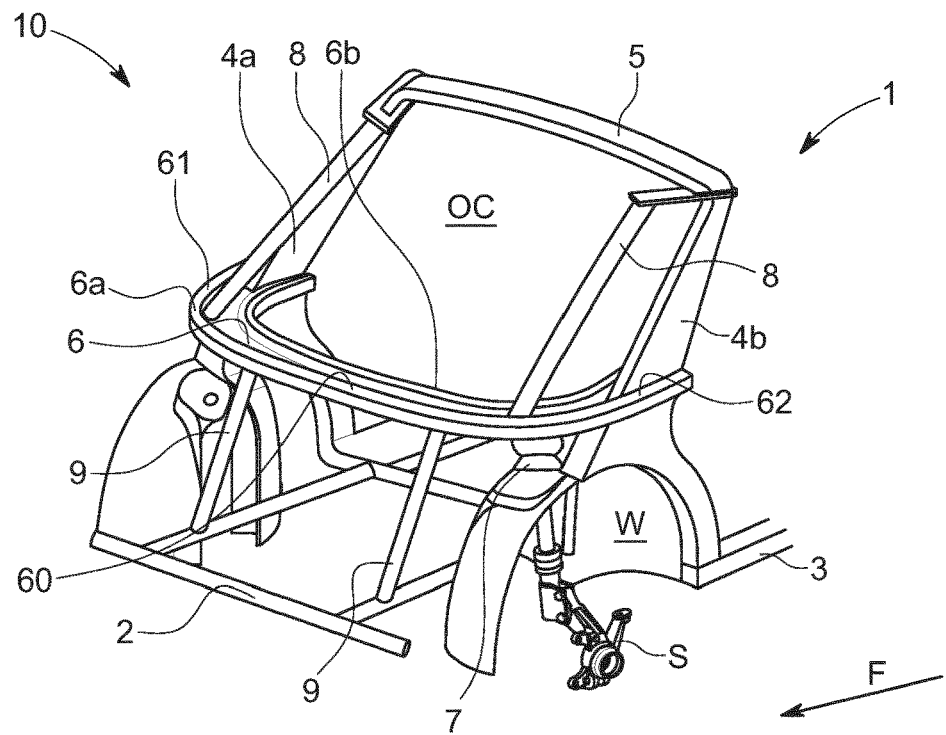
FIG. 1 shows a perspective partial view of a vehicle assembly comprising a structural frame according to an embodiment of the invention.
Figure 2:
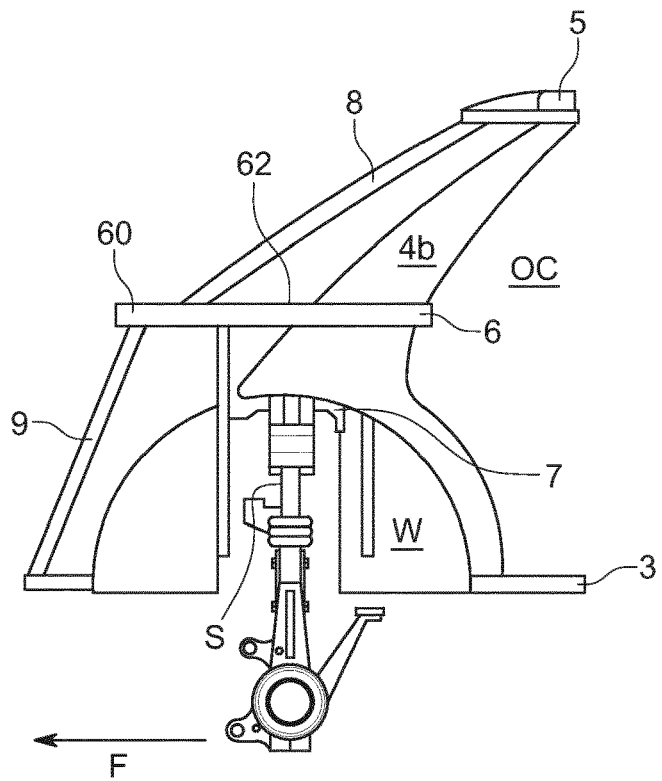
FIG. 2 shows a side partial view of the vehicle assembly shown in FIG. 1.
Figure 3:
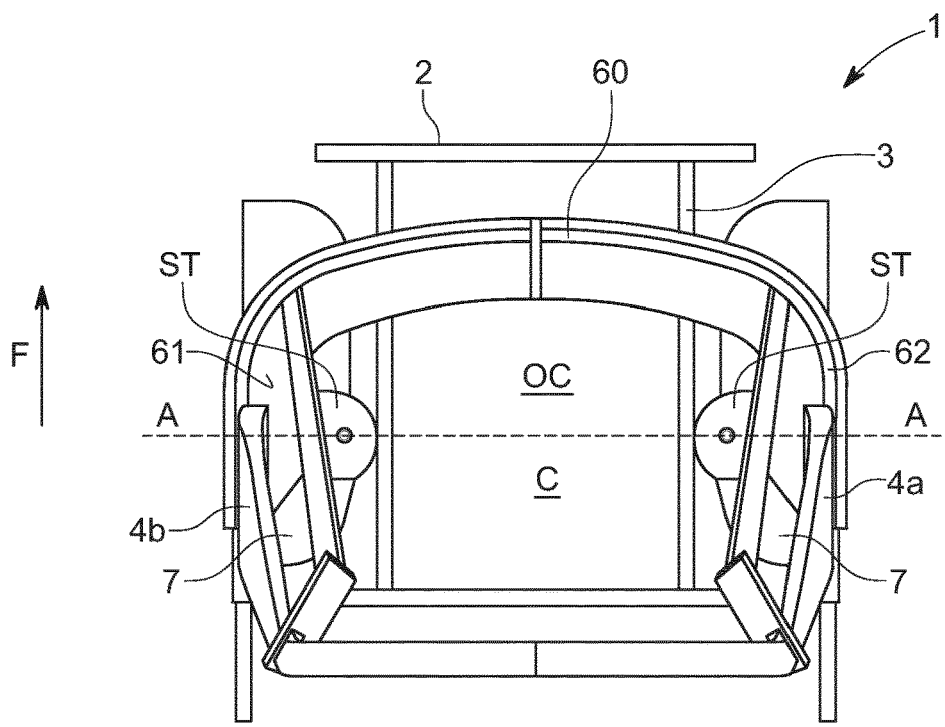
FIG. 3 shows plan partial view of the vehicle assembly shown in FIG. 1.

Referring to FIGS. 1 to 3, there is shown a vehicle assembly 10 according to an embodiment of the invention. The vehicle assembly 10 comprises a structural frame 1 and a suspension assembly S connected thereto. In the example shown, the suspension assembly S comprises Macpherson struts S, in this embodiment. In embodiments, however, the suspension assembly S may comprise double wishbones, instead, or alternatively any other suitable suspension assembly S.

The structural frame may comprise a pair of aprons. The aprons may each include or be attached or attachable (e.g. directly or indirectly) to one of the suspension connectors (where provided). Each pillar may be mounted to the base adjacent (e.g. directly) or via (e.g. at least partially) one of the aprons. In embodiments, at least part of each arm (where provided) of the cross-brace may be above one or both of the aprons. Each apron may comprise or form part of a wheel house or wheel arch which may in turn comprise or form part of a wheel arch inner panel. Once the vehicle is fully assembled, the wheel house or wheel arch generally comprise: a wheel arch inner panel which may be integrally formed with the structural frame or attached thereto; and a wheel arch outer panel, typically formed as a component of the vehicle body or as part of a front fascia. The wheel, tyre and much of the attendant suspension assembly is accommodated within the wheel house or wheel arch once the vehicle is fully assembled.

As described above, the suspension assembly S is accommodated, at least in part, in a wheel house or wheel arch, above which is a tower ST arranged to provide a suitably rigid upper anchorage or reaction surface for the suspension assembly S. This tower ST (shown clearly in FIG. 3) may be formed as part of the structural frame, as a formation in the wheel arch inner panel, or as part of the vehicle body VB and must be sufficiently rigid to provide reliable and predictable suspension performance during use. The tower may take the form of: a shock tower arranged for connection to a damper; a strut tower arranged for connection to a spring-damper assembly such as a Macpherson strut; a suspension tower arranged for connection to an active suspension unit; a spring tower arranged for connection to a coil spring, an air spring, a leaf spring, or a torsion spring. Alternatively, the tower may take the form of a suitably rigid wheel arch inner panel configured to support the suspension assembly.

The structural frame 1 (which is for the body of a motor vehicle shown generally at V) comprises a front 2, a base 3, first and second, spaced pillars 4a, 4b, a roof member 5, a structural cross-brace 6 and a pair of suspension connectors 7. In embodiments, however, the structural frame 1 may be provided absent one or more of the front 2, the base 3, the roof member 5 and the pair of suspension connectors 7.

The front 2 is directly attached to the base 3, in this embodiment. In embodiments, however, the front 2 may be indirectly attached to the base 3 (for example via one or more further component parts).

Only a portion of the base 3 is shown in FIGS. 1 to 3, however, as will be appreciated, the base 3 extends substantially along the length of a motor vehicle comprising the structural frame 1, in this embodiment. In embodiments, however, the base 3 may extend along any suitable proportion of the length of a motor vehicle comprising the structural frame 1 (e.g. along the entire length, a major portion of the length or a minor portion of the length). The base 3 may comprise or accommodate a traction battery arranged to supply electrical power to a traction motor M, which in turn is arranged to provide at least a portion of the motive power for the vehicle.

The first and second pillars 4a, 4b (which are A-pillars in this embodiment) are mounted to the base 3 at one of their ends (at a lower region thereof) and are connected to the roof member 5 at the other of their ends (at an upper region thereof).

The roof member 5 comprises a roof support beam or crossmember 5, otherwise known as a header rail or roof frame, which extends across the distance between the pair of spaced pillars 4a, 4b, in this embodiment. The roof crossmember 5 is for attachment to a roof (not shown). The roof is attached to the roof crossmember 5 in any suitable manner, for example via welding, adhesive, rivets and/or bolts or the like. In embodiments, however, the roof member 5 may comprise the roof, which may be directly attached to the pillars 4a, 4b. The pillars and roof crossmember form, at least in part, a support structure for the roof which defines an upper boundary to an occupant compartment OC provided within the vehicle body. Additionally, the pillars and roof crossmember define a front end of the occupant compartment as they are arranged to further support glazing members such as a windshield or windscreen and may also include side windows and/or a rear window (see FIGS. 4 and 7). The pillars and roof crossmember may further be arranged to support exterior body panels defining at least in part an exterior surface for the vehicle and also interior body panels and/or interior trim parts defining at least in part an interior surface in the occupant compartment OC. This arrangement will be described in more detail in relation to FIGS. 4 and 5.

The structural cross-brace 6 is connected to each pillar 4a, 4b at a location between the base 3 and the roof member 5 (e.g. at a location spaced from the base 3). The structural cross-brace 6 comprises a cross-member 60 and first and second arms 61, 62 which extend from opposed ends of the cross-member 60. The first arm 61 secures the structural cross-brace 6 to the first pillar 4a and the second arm 62 secures the structural cross-brace 6 to the second pillar 4b. The arms 61, 62 of the structural cross-brace 6 extend forwardly from the pillars 4a, 4b (e.g. toward the front 2) such that the structural cross-brace 6 projects from the pillars 4a, 4b in a forward direction F. The cross-member 60 forms a generally C-shape or U-shape, in plan, in this embodiment (as best seen in FIG. 3). The first and second arms 61, 62 extend in a substantially linear direction, in this embodiment. The first and second arms 61, 62 are substantially parallel to one another, in this embodiment. In embodiments, however, the first and second arms 61, 62 may be at least partially curved and/or may not be substantially parallel to one another.

From the Figures and from the description of the cross-brace 6, it will be appreciated that it may be formed as a sub-assembly for assembly onto the structural frame 1 or may be integrally formed with the structural frame 1. The cross-brace may be formed from metal tubing, it may be formed by metal extrusion, casting or forging, or could be formed from composites material such as fibre-reinforced plastic or carbon fibre. Other material and assembly techniques are useful.

The structural cross-brace 6 comprises a generally flat plate, in this embodiment. A first stiffening flange 6a projects from an outer periphery of the structural cross-brace 6 and along the cross-brace's 6 entire length. A second stiffening flange 6b projects from an inner periphery of the structural cross-brace 6 and along the entire length of the cross-brace 6. Advantageously, the stiffening flanges 6a, 6b enhance the stiffness of the structural cross-brace 6 such that it is capable (in concert with the front 2, base 3 and roof member 5) of providing sufficient resistance to roof crush, torsional loading and loading into the vehicle body from the vehicle suspension during use. The stiffening flanges 6a, 6b add significantly to the torsional rigidity of the cross-brace 6 with negligible additional weight and/or parts complexity.

The pair of suspension connectors 7 are each attached to a pillar 4a, 4b (thereby being indirectly mounted to the base 3), in this embodiment. In embodiments, however, the suspension connectors 7 may be directly mounted to the base 3 or may additionally or alternatively be mounted to the base 3 via one or more components other than the pillars 4a, 4b. The pair of suspension connectors 7 are each attached to a pillar 4a, 4b at a location forward of the mounting point of the pillars 4a, 4b to the base 3 and of the connection point of the pillars 4a, 4b to the roof member 5. A Macpherson strut of the suspension assembly S is connected to each of the suspension connectors 7.

The structural cross-brace 6 projects beyond the suspension connectors 7 (as best shown in FIG. 2). In this way the cross-member 60 is beyond the suspension connectors 7, in this embodiment. Accordingly, the space C between the pillars 4a, 4b within the occupant compartment is unobstructed by the structural cross-brace 6, in this embodiment (as most clearly shown in FIG. 3).

The structural frame 1 additionally comprises upper and lower frame struts 8, 9, in this embodiment. The upper frame struts 8 join the structural cross-brace 6 to the roof member 5. The lower frame struts 9 join the structural cross-brace 6 to the base 3. The struts 8, 9 advantageously further improve the resistance of the structural frame 1 to roof crush, loading from the vehicle suspension and/or torsional forces. Without wishing to be bound by any particular theory it is believed that the struts 8, 9 act to further distribute loads applied to components of the structural frame 1 (or attached thereto), for example forces applied to the roof member 5 may be transferred to the base 3 via both the pillars 4a, 4b and the struts 8, 9, thereby reducing the force transferred through the pillars 4a, 4b alone (which would be the case absent the struts 8, 9).

As will be appreciated, although wheel houses comprising a wheel arch inner panel, a tower and wheel arches W are shown in FIGS. 1 to 4 these need not form part of the structural frame assembly and are shown for illustrative purposes. These components may be assembled independently of the structural frame and attached thereto during vehicle assembly. In embodiments, however, the vehicle assembly (or the structural frame) may comprise wheel arches W.

Figure 4:
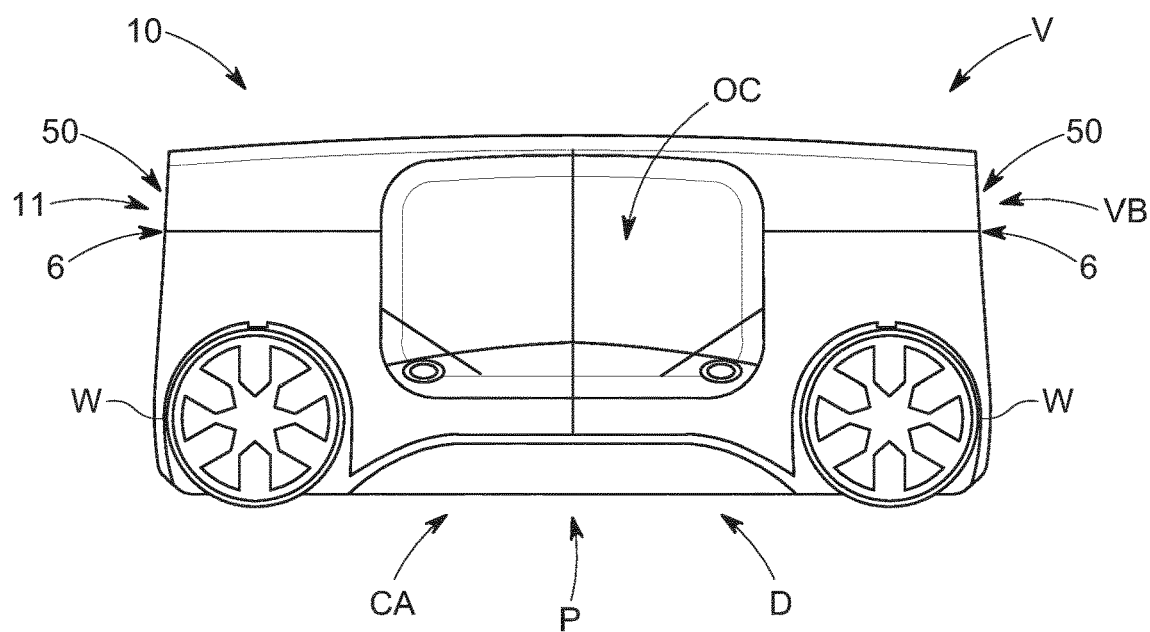
FIG. 4 shows a side view of a vehicle according to an embodiment of the invention
Figure 5:
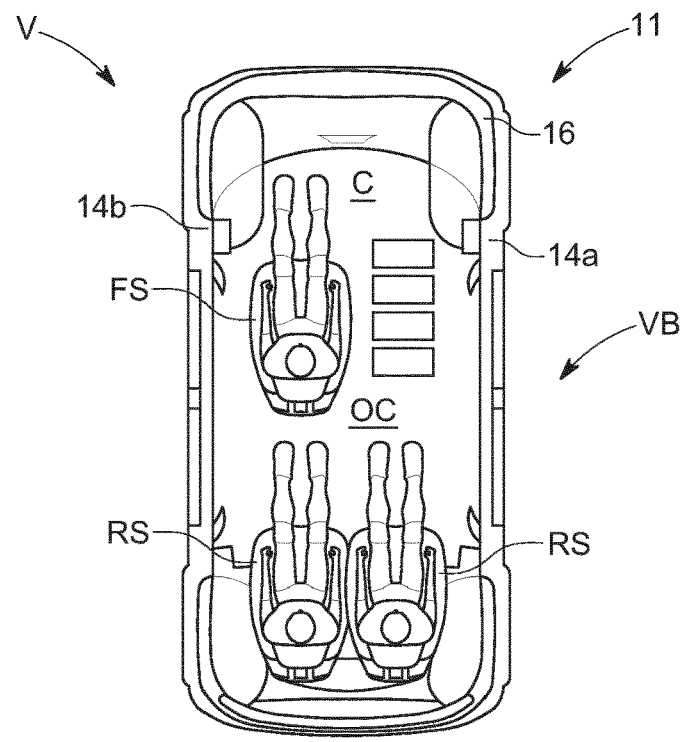
FIG. 5 shows a cut-away plan view of the vehicle shown in FIG. 4 with occupants therein.

Referring now to FIGS. 4 and 5, there is shown a vehicle V according to an embodiment of the invention. The vehicle V comprises a vehicle body VB which encloses an occupant compartment OC accessible by doors, the vehicle body VB may additionally or alternatively at least partially enclose a luggage or cargo compartment (not shown). The vehicle V comprises a chassis assembly CA onto which is mounted a structural frame 11 according to an alternative embodiment of the invention, wherein like features to those described in respect of the structural frame 1 shown in FIGS. 1 to 3 are identified by like references preceded by a '1' and will not be described herein further. The structural frame 11 is detachably secured to the chassis assembly CA, in this embodiment. However, in embodiments, the structural frame may be permanently (i.e. non-detachably) secured to the chassis assembly CA.

Figure 6:
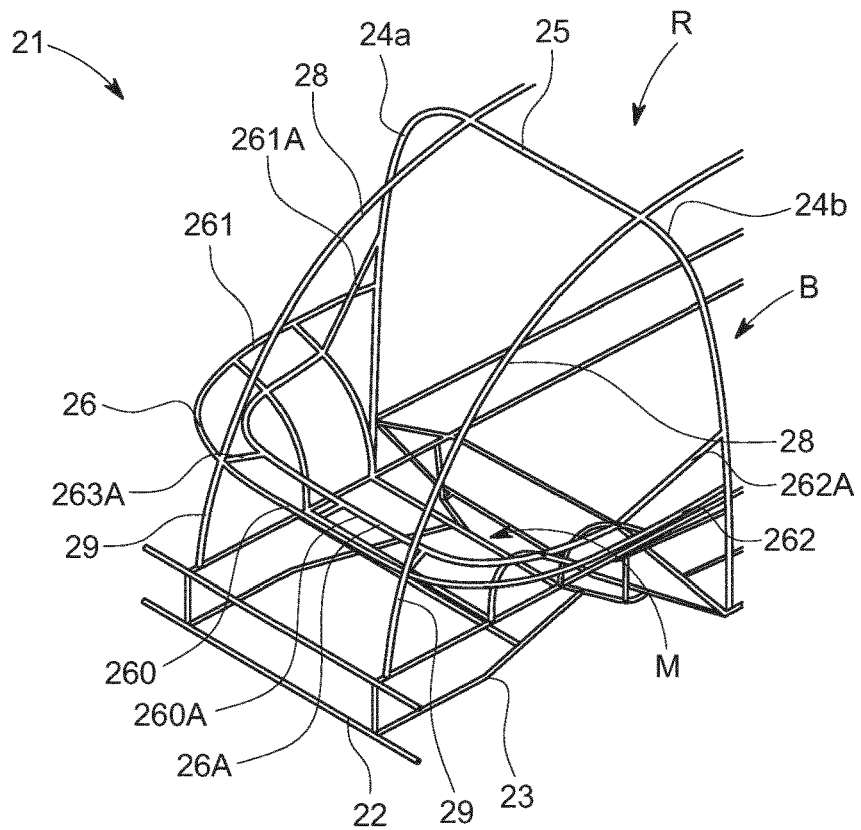
FIG. 6 shows a partial perspective schematic view of a structural frame for a motor vehicle according to an embodiment of the invention.

The chassis assembly CA comprises a drivetrain and power unit P, which comprises an electric motor M in this embodiment. The location of the traction motor M in this embodiment is shown in FIGS. 6 and 7. The vehicle V may advantageously be an autonomous vehicle.

Beneficially, ensuring that the space C between the pillars 14a, 14b is substantially unobstructed (or entirely unobstructed, as in the present embodiment) by the structural cross-brace 16 allows greater flexibility with regard to positioning of seats FS, RS within the occupant compartment OC.

In particular, the front seat FS may be positioned relatively further forward than would otherwise be possible, such that an occupant of said front seat FS may at least partially extend into the space C between the pillars 14a, 14b (as shown in FIG. 5). By moving the front seat FS relatively further forward the space between the front seat FS and rear seats RS is relatively increased, thereby providing enhanced comfort and an improved travel experience to occupants of the rear seats RS. As may be seen from the example shown in FIG. 5, glazing members, shown generally at 50, are provided in the form of a front windscreen and a rear window define front and rear boundaries respectively for the occupant compartment. In the example shown, the glazing members 50 are each supported by structural crossmembers shown generally at 6. These crossmembers 6 are accommodated within the occupant compartment OC, outboard of the respective front and rear axles. A small part of each crossmember 6 protrudes beyond the occupant compartment OC so as to provide a suitable surface on which a lower region of the glazing members 6 are supported. The structural cross-brace 6 may be provided with one or more glazing surfaces arranged to support and secure at least a portion of one or more glazing member(s), which, once installed define, at least in part, a periphery of the occupant compartment.

In FIG. 5, it may be seen that the rear seats RS are at least partially supported by the rear cross-brace 6. Advantageously, due to its position within the occupant compartment OC and it high strength and rigidity relative to other interior components of the vehicle, the structural cross-brace 6 when mounted to the front and/or rear of the occupant compartment lends itself to being used as a support for other components often accommodated within a vehicle occupant compartment. The structural cross-brace 6 may be provided with mounting means with which to mount in the occupant compartment OC at least one of: a steering column to which a steering wheel may be mounted; a display panel to provide the driver or other vehicle occupants information about their journey or the status of the vehicle; a seating component such as a seat back as shown in the figure for the rear seats RS or a seat base, such as a perch seat to provide additional comfort for standing occupants; an energy absorbing passive occupant restraint device such as a knee bolster or airbag reaction surface; a storage compartment such as a glovebox or lockable storage locker; a vehicular user interface such as a switch panel; an inflatable airbag; and/or an interior trim component.

Referring now to FIG. 6, there is shown a structural frame 21 for the body of a motor vehicle according to an alternative embodiment of the invention, wherein like features to those described in respect of the structural frame 1 shown in FIGS. 1 to 3 are identified by like references preceded by a '2' and will not be described herein further. The structural frame 21 shown in FIG. 6 differs from the structural frame 1 shown in FIGS. 1 to 3 in that a roof R is provided, that the structural cross-brace 26 is formed as a tube or bar, and that a further structural cross-brace 26A is provided.

The roof R is attached to the roof member 25 by welding thereto, in this embodiment. In embodiments, however, the roof R may be attached to the roof member 25 additionally or alternatively by adhesive, catches, clips, hooks, bolts, screws or other attachments. Note the roof R is also clearly shown in FIG. 4.

The base 23 comprises a chamber B for storage or retention of various components of a motor vehicle. For example, one or more power sources (such as batteries), electrical control systems, and the like may be stored or retained in the chamber B. Another compartment is formed between the wheels under the floor, shown generally at M, this chamber is arranged to accommodate driveline components such as a transmission connected to the front wheels and a means for providing motive force, such as an electric traction motor, connected to the transmission. Other driveline or powertrain components may also be accommodated within compartment M and a second compartment M may also be formed between the rear wheels in a similar manner.

The further structural cross-brace 26A is also formed as a tube or bar in this embodiment. The further structural cross-brace 26A is rearward of the structural cross-brace 26, in this embodiment. In embodiments, however, the further structural cross-brace 26A may be forward (e.g. nearer to the front 22) than is the structural cross brace 26. Additionally or alternatively, the further structural cross-brace 26A may be above (e.g. spaced further from the base 23) the structural cross-brace 26. The structural cross-brace 26 is attached to the further structural cross-brace 26A by connectors 263A, which extend substantially perpendicularly from each of the structural cross-brace 26 and further structural cross-brace 26A, in this embodiment.

The further structural cross-brace 26A comprises a further cross-member 260A from opposed ends of which extend further first and second arms 261A, 262A. The further first arm 261A secures the further structural cross-brace 26A to the first pillar 24a and the further second arm 262A secures the further structural cross-brace 26A to the second pillar 24b. The further cross-member 260A is sized and shaped to conform to the size and shape of the cross-member 260, in this embodiment. The further cross-member 260A is located in a plane defined by the cross-member 260. The further cross-member 260A is substantially equally distant from the cross-member 260, e.g. along its length.

At least a portion of the further pair of arms 261A, 262A extends toward the pillars 24a, 24b from the cross-member 260A in a direction which is angled relative to the base 23 and to a plane containing the cross-member 260A. Each of the further pair of arms 261A, 262A secures the further structural cross-brace 26A to each of the pillars 24a, 24b at a location above (e.g. further spaced from the base 23 than) the location where the pair of arms 261, 262 secures the structural cross-brace 26 to the pillars 24a, 24b. Beneficially, the angled portion of the further pair of arms 261A, 262A provides the structural frame 21 with enhanced body rigidity good resistance to roof crush, torsional loading and/or loading from the vehicle suspension.

Without wishing to be bound by any particular theory, it is believed that by angling at least a portion of the further pair of arms 261A, 262A, loads which would otherwise pass entirely or predominantly through the pillars 24a, 24b (e.g. between the roof member 25 and the base 23) will be shared (at least in part) with the further structural cross-brace 26A. Accordingly, the pillars 24a, 24b may be subjected to relatively reduced loading for a given applied force.

In the embodiment of the structural frame 21 shown in FIG. 6, the upper and lower struts 28, 29 are integrally formed. Advantageously, loads applied to the roof member 26 (directly or indirectly) may be more directly and/or readily transferred to the base 23. Furthermore, such an arrangement may be simpler to manufacture, requiring fewer component parts and relatively reduced manufacturing steps than is the case with separate upper and lower struts (as shown in the FIG. 1 embodiment).

In embodiments, the structural cross-brace 26 and further structural cross-brace 26A may comprise a panel (e.g. a continuous panel) extending therebetween, for example from one to the other. Where a panel is provided the connectors 263A may be absent. Where a panel is provided, the panel may extend along the majority or the entirety of the cross-members 260, 260A and/or one or each of the pair of arms 261, 262 and further pair of arms 261A, 262A. In embodiments, the structural cross-brace 26 and further structural cross-brace 26A may comprise or be flanges, for example an inner and outer flange, of a panel.

Figure 7A:
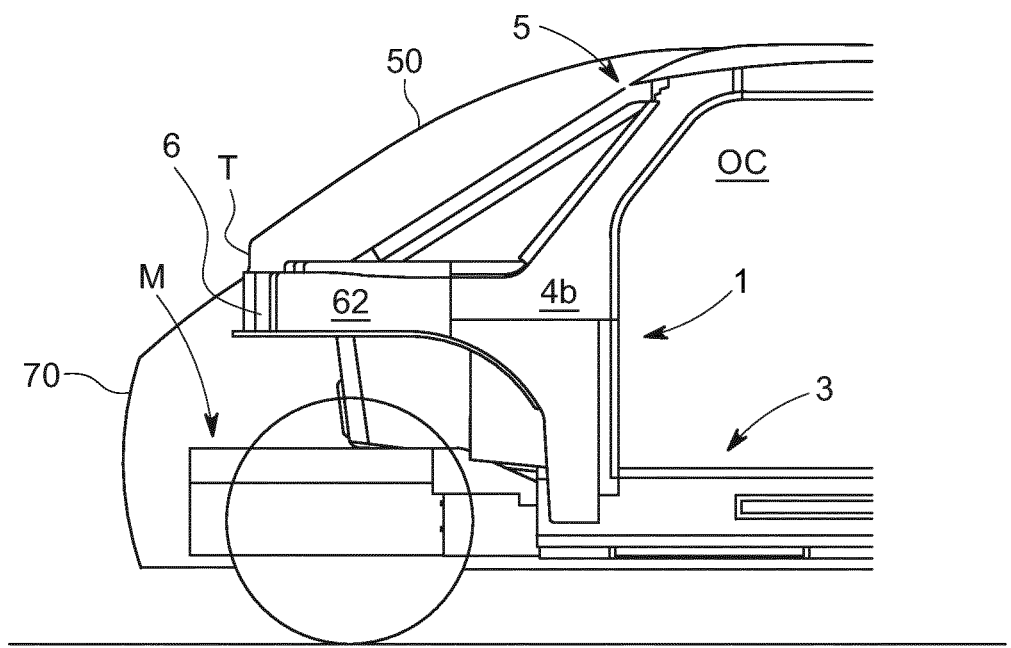
FIGS. 7A & 7B show front side elevations of alternative examples of vehicles comprising a structural frame according to an embodiment of the invention, where
Figure 7B:
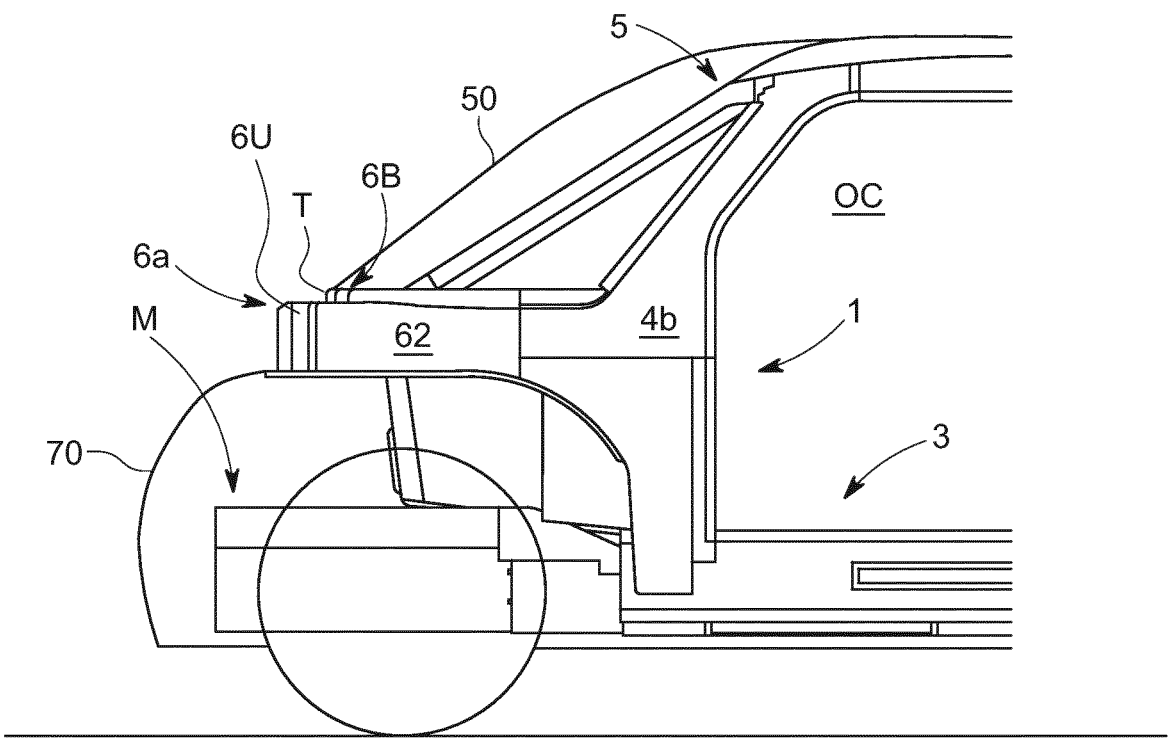

Finally, turning to FIGS. 7A & 7B, which show front side elevations of alternative examples of vehicles V comprising a structural frame 1 according to an embodiment of the invention. For clarity, only a portion of the front of the vehicle body VB is shown in each example, but it may be clearly seen that the cross-brace 6 of the structural frame 1 extends beyond a front axle line, shown by dashed line A-A in FIG. 3, that is to say, a transverse vertical plane that passes through the centres of both front wheels. FIG. 7a shows an example of a vehicle where a windscreen 50 is supported by an outer or leading surface of a cross-member 60 of the structural frame 1. In this example, the cross-member 60 is accommodated substantially within the occupant compartment OC, with only the first stiffening flange 6a projecting beyond the occupant compartment OC, sufficiently to provide a suitable supporting and sealing surface on which to support the windscreen 50, to which is bonded, and thus sealed with, the windscreen 50 using windscreen adhesive in a known manner. In an example of this arrangement, vehicle components such as windscreen wipers and their attendant wiper motors and drives (not shown) may be supported by the cross-brace 6, the windscreen wipers are located on the outside face of the windscreen 50 and driven via suitable drive means via a through-hole in a trim piece T abutting the base of the windscreen 50. This trim piece T may be integrally formed in the cross-brace 6 or be separate from— but secured thereto using conventional means such as clips or threaded fasteners, etc. In this way, the cross-brace 60 may provide some of the support surfaces normally provided by a cowl feature of a known vehicle without the attendant loss of useful volume in the occupant compartment OC.

In contrast, the example shown in FIG. 7B shows an example where the windscreen 50 is supported by an inner surface such as the inner stiffening flange 6b provided on an inner or trailing surface of a cross-brace 6. In this example, a significant portion of the cross-brace 6 extends beyond the occupant compartment OC. Again, like the example of the vehicle described in FIG. 7A, vehicle components such as the windscreen wiper components may be housed in or on the cross-brace 6 as described above, but rather than driving the wipers via drive means connecting the wiper to the motor via a through-hole in a trim piece T, the through-hole may be formed in an upper surface 6U of the cross-brace 6 itself and the trim piece omitted.

In both cases shown in FIGS. 7A and 7B, a front fascia 70 forming a front bumper trim and front trim panel may extend from the base of the vehicle ahead of the front wheel and extend up to the outer periphery of the cross-brace 6, either to an upper surface as shown in FIGS. 7A & 7B, or alternatively to another position on the cross-brace 6 such as a leading lower edge. The front fascia 70 may be connected to and at least partially supported by the cross-brace 6. The front fascia 70 may accommodate vehicle components (not shown) such as lamp assemblies for exterior lighting, signalling etc., and may further accommodate vehicle sensing components (not shown) such as: radar transducers &/or arrays; lidar transducers &/or arrays; cameras arranged to observe the surroundings of the vehicle; electromagnetic sensors or transducers such as ultrasonic distance measuring sensors and/or external sounder devices; or any other suitable transducer as may be required to enable the vehicle to operate on public roads or on private land semi-autonomously or fully autonomously. Any or all of these components may be mounted to the fascia 70 and/or the cross-brace 6 as may be desired based on the available packaging volume and the desired height of the component above the ground on which the vehicle stands. The front fascia 70 may also comprise a hinged flap (not shown), which may be arranged to lie flush with the surrounding outer surface of the fascia 70 when in a closed position. This flap may be hingedly opened outwardly to allow access to a luggage compartment or to a service panel on which may be provided service points for checking and refilling fluid levels for screenwash fluid, brake fluid, steering fluid, hydraulic fluid, coolant or any other service item or consumable.

Depending on the intended application of the vehicle, the windscreen 50 and occupant compartment OC may be configured appropriately using the cross-brace 6 as described above. For example, where the vehicle is to be operated by a human driver, it will be desirable to move the windscreen 50 rearward, closer to the A-pillars 4a, 4b, as per the example shown in FIG. 7B, in order to obtain a suitable degree of visibility for the driver of the area surrounding the vehicle. This necessitates a compromise on total volume of the occupant compartment OC, but still benefits from the high torsional rigidity and reduced component complexity offered by the structural frame 1 and cross-brace 6 as described above. Alternatively however, where the vehicle is to be operated substantially autonomously, the windscreen 50 may be moved forward to the leading edge of the cross-brace 6, greatly enhancing the available space within the occupant compartment OC. In this arrangement, the structural frame 1 may remain substantially unchanged whilst supporting a range of vehicles, both human operated and autonomous, allowing the manufacturer to share a greater proportion of components to keep development time and cost to a minimum.

All of the features disclosed in this specification (including any accompanying claims, abstract and drawings) may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A structural frame for a body of a motor vehicle, the structural frame defining, at least in part, an occupant compartment of the motor vehicle, the structural frame comprising a pair of spaced pillars joined together at an upper region of each pillar to a roof crossmember and further joined together at respective points below the roof crossmember to a structural cross-brace, wherein the structural cross-brace is further arranged to support a pair of spaced apart vehicle suspension connectors, and wherein the structural cross-brace projects from the pillars beyond the vehicle suspension connectors so that space in the occupant compartment between the pillars is substantially unobstructed by the structural cross-brace and at least a portion of the structural cross-brace is accommodated within the occupant compartment, the structural frame further comprising one or more frame struts joining the structural cross-brace to the roof crossmember, wherein the structural cross-brace comprises a cross-member and a pair of arms which extend from the cross-member and secure the structural cross-brace to the pillars, the arms extending forwardly from the pillars such that the space between the pillars is unobstructed by the cross-member, the arms extending in a linear direction substantially parallel to one another and the cross-member being bowed such that the structural cross-brace forms a U-shape in plan, and wherein each arm of the structural cross-brace is attached or attachable to a respective one of the vehicle suspension connectors.

2. The structural frame of claim 1, whereby the vehicle suspension connectors comprise at least one selected from the group consisting of: a shock tower; a strut tower; a suspension tower; a spring tower; and a wheel arch inner panel, and wherein the structural cross-brace is arranged to, at least in part, connect the vehicle suspension connectors to the roof crossmember via the pillars.

3. The structural frame of claim 1, comprising a base to which the pair of spaced pillars are mounted at respective lower regions distal from upper regions and the roof crossmember, and wherein the structural frame comprises one or more frame struts joining the structural cross-brace to the base.

4. The structural frame of claim 1, whereby the structural cross-brace is arcuate in plan-view and extends substantially perpendicular to the pillars, the structural cross-brace extending from opposing end regions at the pillars towards a central region substantially at a centreline of the motor vehicle between the pillars, and wherein an inner face of the central region of the structural cross-brace is accommodated within the occupant compartment of the motor vehicle and an outer face of the central region of the structural cross-brace extends towards an exterior of the occupant compartment.

5. The structural frame of claim 4, whereby the structural cross-brace is shaped to correspond with a glazing member of the motor vehicle, the glazing member located between the roof crossmember and the structural cross-brace, and wherein the structural cross-brace is provided with a glazing surface arranged to support and secure at least a portion of the glazing member so as to define, at least in part, a periphery of the occupant compartment.

6. The structural frame of claim 4, whereby the structural cross-brace comprises an inner arc and an outer arc joined rigidly together by a stiffening flange interposed between the inner and outer arcs.

7. The structural frame according to claim 1, wherein the structural cross-brace defines either or both of a front end of the occupant compartment and a rear end of the occupant compartment.

8. The structural frame of claim 1, wherein at least part of each arm of the structural cross-brace is above one of the vehicle suspension connectors.

9. The structural frame of claim 1, wherein the structural frame comprises a stiffening flange arranged to extend about an outer periphery of the structural cross-brace, where the outer periphery has a face that is directed away from the occupant compartment.

10. The structural frame of claim 9, wherein the stiffening flange extends about an inner periphery of the structural cross-brace, and wherein the inner periphery has a face that is directed towards the occupant compartment.

11. The structural frame according to claim 10, wherein the structural cross-brace comprises a flat plate from which the or each stiffening flange projects.

12. A vehicle body comprising the structural frame of claim 1, wherein the structural cross-brace substantially conforms to a front profile of the vehicle body.

13. The vehicle body according to claim 12, wherein an outer surface of the structural cross-brace defines, at least in part, an exterior surface of the vehicle body.

14. A vehicle comprising a chassis assembly to which is mounted the structural frame according to claim 1.

15. The vehicle of claim 14, wherein the structural frame or vehicle body is detachably secured to the chassis assembly.

* * * * *